(12) United States Patent
Moon et al.

(10) Patent No.: US 10,106,916 B2
(45) Date of Patent: Oct. 23, 2018

(54) WEAR POLYTETRAFLUOROETHYLENE (PTFE) FIBER AND METHOD OF MAKING SAME

(71) Applicant: Toray Fluorofibers (America), Inc., Decatur, AL (US)

(72) Inventors: Chester Darryl Moon, Tuscumbia, AL (US); Arthur Russell Nelson, Decatur, AL (US); Trevor Guldstrand, Madison, AL (US); Matt Hutto, Courtland, AL (US)

(73) Assignee: TORAY FLUOROFIBERS (AMERICA), INC., Decatur, AL (US)

( * ) Notice: Subject to any disclaimer, the term of this patent is extended or adjusted under 35 U.S.C. 154(b) by 72 days.

(21) Appl. No.: 14/978,619

(22) Filed: Dec. 22, 2015

(65) Prior Publication Data

US 2016/0108557 A1 Apr. 21, 2016

Related U.S. Application Data

(63) Continuation-in-part of application No. 13/953,401, filed on Jul. 29, 2013.

(51) Int. Cl.
| | |
|---|---|
| *D01F 6/12* | (2006.01) |
| *D01D 5/00* | (2006.01) |
| *D02G 3/02* | (2006.01) |
| *D01F 1/10* | (2006.01) |
| *D01D 5/247* | (2006.01) |
| *D01F 2/28* | (2006.01) |
| *C08K 3/22* | (2006.01) |

(52) U.S. Cl.
CPC .............. *D01F 6/12* (2013.01); *D01D 5/00* (2013.01); *D01D 5/247* (2013.01); *D01F 1/10* (2013.01); *D02G 3/02* (2013.01); *C08K 2003/2227* (2013.01); *D01F 2/28* (2013.01); *D10B 2321/042* (2013.01)

(58) Field of Classification Search
USPC ............................................ 524/430; 264/13
See application file for complete search history.

(56) References Cited

U.S. PATENT DOCUMENTS

| | | | |
|---|---|---|---|
| 2,586,357 A | 2/1952 | Llewellyn et al. | |
| 2,685,707 A | 8/1954 | Llewellyn et al. | |
| 2,772,444 A * | 12/1956 | Burrows ................... | D01F 6/12 106/166.6 |
| 3,114,672 A * | 12/1963 | Schott .................. | D21H 5/1227 162/146 |
| 3,655,853 A * | 4/1972 | Gallup et al. ............. | D01F 6/48 264/127 |
| 3,932,576 A | 1/1976 | Patel | |
| 3,953,566 A | 4/1976 | Gore | |
| 4,302,556 A | 11/1981 | Endo et al. | |

(Continued)

*Primary Examiner* — Mark Kaucher
*Assistant Examiner* — Henry Hu
(74) *Attorney, Agent, or Firm* — C. Brandon Browning; Maynard, Cooper & Gale, PC

(57) ABSTRACT

A fluoropolymer fiber exhibiting improved wear properties prepared from a blend of fluoropolymer particles and aluminum oxide particles. The concentration of aluminum oxide particles in the blend ranges from between about 0.1% to about 5%, with a specific concentration of 0.1% to 1.0%. The fluoropolymer fibers may be dispersion spun, melt spun or paste extruded.

14 Claims, 4 Drawing Sheets

(56) References Cited

U.S. PATENT DOCUMENTS

| | | | | |
|---|---|---|---|---|
| 5,723,081 A | * | 3/1998 | Blankenbeckler | D01F 6/12 |
| | | | | 264/127 |
| 5,762,846 A | * | 6/1998 | Blankenbeckler | D01F 6/12 |
| | | | | 264/127 |
| 5,820,984 A | | 10/1998 | Blankenbeckler et al. | |
| 6,174,473 B1 | | 1/2001 | Levy et al. | |
| 9,422,642 B2 | * | 8/2016 | Moon | D01F 6/12 |
| 2005/0025967 A1 | * | 2/2005 | Lawton | C03C 25/00 |
| | | | | 428/375 |
| 2005/0048294 A1 | * | 3/2005 | Kaplan | G03G 15/2057 |
| | | | | 428/447 |
| 2008/0063965 A1 | * | 3/2008 | Lai | G03G 9/0804 |
| | | | | 430/108.1 |
| 2009/0241983 A1 | * | 10/2009 | Williams | A61C 15/041 |
| | | | | 132/321 |
| 2011/0048220 A1 | * | 3/2011 | Dickson | B32B 5/12 |
| | | | | 89/36.02 |
| 2012/0199263 A1 | * | 8/2012 | Thomas | B29C 70/34 |
| | | | | 156/62.2 |
| 2014/0044929 A1 | * | 2/2014 | Evans | B32B 5/18 |
| | | | | 428/190 |
| 2014/0162065 A1 | * | 6/2014 | Surendran | H01B 3/12 |
| | | | | 428/402 |

* cited by examiner

WEAR POLYTETRAFLUOROETHYLENE (PTFE) FIBER AND METHOD OF MAKING SAME

RELATED

This application claims priority to and is a continuation in part of U.S. patent application Ser. No. 13/953,401, filed on Jul. 29, 2013, now U.S. Pat. No. 9,422,642, and entitled, "Improved Wear Polytetrafluoroethylene (PTFE) Fiber and Method of Making Same, the entire contents of which are incorporated herein by reference.

FIELD OF THE INVENTION

The present invention is directed to a fluoropolymer fiber, and more particularly, to a fluoropolymer fiber prepared from polytetrafluoroethylene particles and aluminum oxide particles.

BACKGROUND OF THE INVENTION

Fluoropolymers have properties such as extremely low coefficient of friction, wear and chemical resistance, dielectric strength, temperature resistance and various combinations of these properties that make fluoropolymers useful in numerous and diverse industries. For example, in the chemical process industry, fluoropolymers are used for lining vessels and piping. The biomedical industry has found fluoropolymers to be biocompatible and so have used them in the human body in the form of both implantable parts and devices with which to perform diagnostic and therapeutic procedures. In other applications, fluoropolymers have replaced asbestos and other high temperature materials. Wire jacketing is one such example. Automotive and aircraft bearings, seals, push-pull cables, belts and fuel lines, among other components, are now commonly made with a virgin or filled fluoropolymer component.

Fluoropolymer fibers can be manufactured using one of several processes including dispersion spinning, paste extrusion and melt spinning. For example, dispersion spun or wet fluoropolymer yarns are typically produced by forming a spin mix containing an aqueous dispersion of a non-melt processible fluoropolymer particles and a solution of a cellulosic ether matrix polymer. The spin mix is then extruded at relatively low pressure (e.g., less than 150 pounds per square inch) through an orifice into a coagulation solution usually containing sulfuric acid to coagulate the matrix polymer and form an intermediate fiber structure. The intermediate fiber structure, once washed free of acid and salts, is passed over a series of heated rolls to dry the fiber structure and sinter the fluoropolymer particles into a continuous fluoropolymer filament yarn. Sintering the intermediate fluoropolymer fiber structure causes the fluoropolymer particles in the structure to coalesce and entangle thus forming a continuous fluoropolymer filament fiber.

Paste extruded fibers are typically produced by forming a paste extrusion composition by mixing a non-melt processible or melt processible fluoropolymer fine powder with an organic lubricant. The fluoropolymer soaks up the lubricant, resulting in a dry, pressure coalescing mixture, which is the paste extrusion composition, or simply, the lubricated fluoropolymer powder. The lubricated fluoropolymer powder is placed in an extrusion barrel which terminates in an extrusion head which defines an extrusion orifice. The powder is then "paste extruded" by a ram positioned at the opposite end of the extrusion barrel moving towards the extrusion orifice to force the lubricated fluoropolymer powder through the orifice in such form as sheet, rod, tubing, or coating and through the center of the orifice. The paste extrusion has usually been carried out at a temperature of 20 to 40° C. In most cases, the paste extrudate is then heated to volatilize the lubricant, usually to a temperature of 100 to 250° C., to drive off the lubricant from the extrudate, followed by sintering of the fluoropolymer.

Melt spun fluoropolymer fibers are typically produced by forming granules or pellets of a melt processible fluoropolymer and pumping the melt through a spinneret or die with one to several thousand holes. The molten fibers which exit the spinneret are cooled, solidified and collected on a take-up wheel. Stretching of the fibers in both the molten and solid states provides for orientation of the polymer chains along the fiber axis.

SUMMARY OF THE INVENTION

The present invention is directed to an improved wear fluoropolymer fiber. According to one aspect of the invention there is provided a dispersion spun fluoropolymer fiber including a blend of non-melt processible, high molecular weight, fluoropolymer particles, such as polytetrafluoroethylene fibers, and aluminum oxide ($Al_2O_3$) particles. According to another aspect of the invention, there is provided a paste extruded fluoropolymer fiber including a blend of non-melt processible or melt-processible fluoropolymer particles and aluminum oxide (Al2O3) particles. According to yet another aspect of the invention, there is provided a melt spun fluoropolymer fiber including a blend of melt-processible fluoropolymer particles, such as perfluoroalkoxy, fluorinated ethylene propylene, ethylenetetrafluoroethylene and polyvinylidene fluoride polymers, and aluminum oxide (Al2O3) particles. The concentration of $Al_2O_3$ in the each of the fluoropolymer fibers may range from between about 0.1% to about 5%, with a specific concentration of 0.1% to about 1.0%. The resulting, blended fluoropolymer fibers, which exhibit improved properties relative to 100% fluoropolymer fibers, are suitable for use in bearings, bushings, fabrics, belts, diaphragms, coatings, filters and seals.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

Figure 1A:
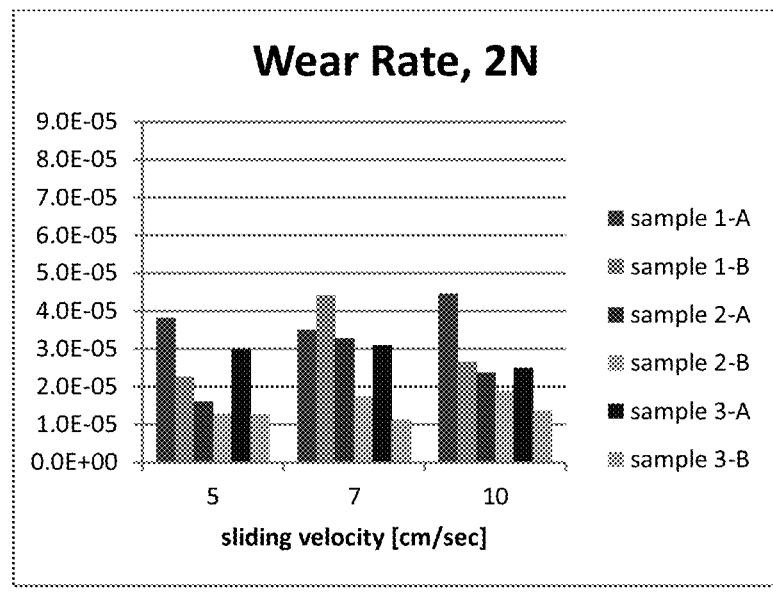
FIG. 1A is a graphical illustration of the calculated wear rates of three vinyl ester film samples with varying concentrations of $Al_2O_3$ and a pin load of 2N.

The present invention is directed to fluoropolymers fiber including a blend of fluoropolymer particles and Al2O3 particles. Preferably, the fibers of the present invention are manufactured by dispersion spinning. By "dispersion spun" it is meant that the fiber is prepared by forming an aqueous dispersion of insoluble fluoropolymer particles and $Al_2O_3$ particles, mixing the dispersion with an aqueous matrix polymer solution containing a matrix polymer, extruding the mixture into a coagulation bath and forming an intermediate fiber structure. The intermediate fiber structure is then sintered to decompose the matrix polymer and coalesce the fluoropolymer particles and the $Al_2O_3$ particles into a blended fiber.

The matrix spinning process of PTFE allows for the inclusion of an appreciable concentration of $Al_2O_3$ into a fiber structure that has sufficient tensile properties for normal textile processing such as knitting and weaving. The inclusion of $Al_2O_3$ into a matrix spun fluoropolymer fiber results in a true bicomponent fluoropolymer fiber with typical thermal capabilities (maximum continuous use temperature) of the fluoropolymer. Further, the inclusion of $Al_2O_3$ into the fiber matrix provides enhanced wear characteristics in the resulting textile product. Specifically, the presently described matrix imparts improved thermal conducting properties and improved cut resistance to fabrics produced from the filament yarns. The resulting fabrics may be utilized in the production of protective clothing, such as clothing and textiles used in high temperature applications, for example laminated cooking belts.

Fluoropolymer

By fluoropolymer it is meant a fiber prepared from polymers such as polytetrafluoroethylene, and polymers generally known as fluorinated olefinic polymers, for example, copolymers of tetrafluoroethylene and hexafluoropropene, copolymers of tetrafluoroethylene and perfluoroalkyl-vinyl esters such as perfluoropropyl-vinyl ether and perfluoroethyl-vinyl ether, fluorinated olefinic terpolymers including those of the above-listed monomers and other tetrafluoroethylene based copolymers. Exemplary fluoropolymers include non-melt-processible polymers such as polytetrafluoroethylene (PTFE) polymers and melt-processible polymers such as perfluoroalkoxy (PFA) polymers, fluorinated ethylene propylene (FEP) polymers, ethylenetetrafluoroethylene (ETFE) polymers and polyvinylidene fluoride (PVDF) polymers. For the purposes of this invention, the preferred fluoropolymer fiber is polytetrafluoroethylene fiber.

The polytetrafluoroethylene particles used in the dispersion employed in this invention are non-melt-processible particles of polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of PTFE with such small concentrations of comonomer that the melting point of the resultant polymer is not substantially reduced below that of PTFE. The concentration of such comonomer is preferably less than 1 wt %, more preferably less than 0.5 wt %. The modified PTFE contains a small amount of comonomer modifier which improves film forming capability during baking (fusing), such as perfluoroolefin, notably hexafluoropropylene (HFP) or perfluoro(alkyl vinyl)ether (PAVE), where the alkyl group contains 1 to 5 carbon atoms, with perfluoro(ethyl vinyl)ether (PEVE) and perfluoro(propyl vinyl)ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1×10^9$ Pa·s. The resins in the dispersion used in this invention when isolated and dried are non-melt-processible. Such high melt viscosity indicates that the PTFE does not flow in the molten state and therefore is non-melt-processible By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

The polytetrafluoroethylene particles have a standard specific gravity (SSG) of less than 2.40, typically from about 2.14 to about 2.40, preferably less than about 2.30, and more preferably less than about 2.25. The SSG is generally inversely proportional to the molecular weight of PTFE or modified PTFE.

Aluminum Oxide

Aluminum oxide is the most commonly occurring of several aluminum oxides, and specifically identified as aluminum(III) oxide. $Al_2O_3$ is often used to produce aluminum metal, as an abrasive owing to its hardness, and as a refractory material owing to its high melting point. $Al_2O_3$ is an electrical insulator but has a relatively high thermal conductivity (30 $Wm^{-1}K^{-1}$) for a ceramic material. Aluminum oxide is completely insoluble in water and its hardness makes it suitable for use as an abrasive and as a component in cutting tools. Aluminum oxide is responsible for the resistance of metallic aluminum to weathering. A thin passivation layer of aluminum oxide (approximately 4 nm) forms on the surface of any exposed aluminum layer after contact with oxygen. This layer protects the metal from further oxidation and enhances corrosion resistance and enhancing hardness.

The $Al_2O_3$ particles in the dispersion preferably have a number average particle size of about 10 microns or less, most preferably, 5 microns or less.

Matrix or Dispersion Spinning

Matrix spinning is utilized to prepare a continuous, multifilament fluoropolymer yarn containing aluminum oxide particles. To that end, the present invention provides a spinning composition useful for the dispersion spinning of non-melt-processible fluoropolymer fiber comprising a mixture of an aqueous solution of a matrix polymer and an aqueous dispersion of $Al_2O_3$ particles and non-melt-processible polytetrafluoroethylene particles having an SSG of less than about 2.40, typically from about 2.14 to about 2.40. In preferred embodiments the non-melt-processible polytetrafluoroethylene particles have an SSG of less than 2.30, and more preferably less than about 2.25. The fluoropolymer particles in the dispersion used in this invention preferably have a number average particle size of about 100 nm to about 400 nm, most preferably, about 120 nm to about 220 nm.

Matrix polymers used in the practice of the present invention may be polymers containing only hydrogen, carbon, oxygen and nitrogen that are soluble in aqueous solutions that may be coagulated or precipitated by a salt or a shift of pH. One method which is commonly used to spin PTFE and related polymers includes spinning the polymer from a mixture of an aqueous dispersion of the polymer particles and viscose, where cellulose xanthate is the soluble form of the matrix polymer, as taught for example in U.S. Pat. Nos. 3,655,853; 3,114,672 and 2,772,444. The aqueous dispersion of $Al_2O_3$ particles and polytetrafluoroethylene particles is prepared by pouring the PTFE dispersion into a tote and adding the $Al_2O_3$ dispersion to the PTFE dispersion. The dispersion is mixed mechanically in the tote for about an hour with slow agitation to avoid shear. The mixed dispersion is then loaded into a supply tank and put under vacuum. In one embodiment, the aqueous dispersion includes, by weight, 95% PTFE and 5% $Al_2O_3$.

However, the use of viscose in fiber forming suffers from serious disadvantages related to cost of manufacture, production time and environmental hazards. Alternatives to viscose forming have been developed and most recently a process using cellulosic ethers with a uniform degree of substitution of the matrix has been fully described in U.S. Pat. Nos. 5,762,846 and 5,820,984. Preferably, the fluoropolymer fiber of the present invention is prepared using a more environmentally friendly method than those methods utilizing viscose. One such method is described in U.S. Pat. Nos. 5,820,984; 5,762,846, and 5,723,081, which patents are incorporated herein in their entireties by reference. In general, this method employs a cellulosic ether polymer such as methylcellulose, hydroxyethylcellulose, methylhydroxypropylcellulose, hydroxypropylmethylcellulose, hydroxypropylcellulose, ethylcellulose or carboxymethylcellulose as the soluble matrix polymer, in place of viscose.

Cellulosic ether polymers are preferred since these polymers do not melt or soften below the temperature range in which most fluorinated olefinic polymers melt and the polymer decomposes into carbonaceous material on sintering. For example, such cellulosic polymers are methylcellulose, hydroxyethylcellulose, methylhydroxypropylcellulose, hydroxypropylmethylcellulose, hydroxypropylcellulose, ethylcellulose and carboxymethylcellulose. The cellulosic ethers preferred for use in this invention as a matrix polymer have a uniform degree of substitution, and are soluble in strong aqueous alkali hydroxide, but insoluble in near neutral pH water. By the term near neutral pH water is meant water having a pH from about 6 to 8. In addition, the matrix polymers used in the practice of the present invention have no softening or melting point. These polymers decompose at temperatures near the sintering temperature of the fiber providing requisite tensile strength until the fluoropolymer particles have coalesced such that the resultant fluoropolymer structure provides the necessary tensile strength.

In order to achieve useful coalesced fluoropolymer fibers, it is desirable to wash the intermediate fiber structure free of ions absorbed from the coagulation bath as well as to remove other impurities such as additives and/or dispersants that are present in the initial fluoropolymer dispersion and to remove materials that are detrimental to fiber sintering and/or the properties of the final, coalesced fluorinated polymer fiber.

As used herein, intermediate fiber structure means the extruded and coagulated mixture of the matrix polymer solution and the polymer particle dispersion. The intermediate fiber structure produced in the practice of the present invention, after washing in near neutral pH water to substantially remove ions and impurities, shows no substantial loss of strength or integrity, and may be worked, for example drawn at a modest draw ratio, and sintered to form a final, coalesced fluorinated polymer fiber or shaped article. The intermediate fiber structure produced by the present invention may be isolated, worked in subsequent processing or used for producing fabrics or batts as is known in this art.

In the practice of the present invention, the composition of the intermediate fiber structure has a cellulosic ether matrix polymer present as a minor constituent of the fiber solids, while the major constituents are $Al_2O_3$ and non-melt processable fluoropolymer particles having a weight in the intermediate fiber structure that may be from 3 to 20 times that of the matrix polymer.

In addition to matrix spinning the aluminum oxide-containing fluoropolymer fibers of the present invention, other methods are anticipated including paste extrusion and melt spinning, which can be utilized to produce fluoropolymer monofilament fibers, multifilament yarns and films each containing aluminum oxide.

Paste Extrusion

Paste extrusion methods can be used with non-melt processible and melt processible polymers. An exemplary paste extrusion method is described in U.S. Pat. No. 6,174,473 owned by E.I. Du Pont De Nemours And Company. The method includes making a polytetrafluoroethylene fine powder by aqueous dispersion polymerization, followed by coagulation of the dispersion and drying of the resultant coagulum to obtain the fine powder. Because the polytetrafluoroethylene fine powder does not flow in the melt condition, the powder is fabricated into an article by an extrusion method which does not require melt flow. Available extrusion methods are described U.S. Pat. Nos. 2,586,357 and 2,685,707, the entire contents of which are incorporated herein. According to the present invention, a paste extrusion composition can formed by mixing a fluoropolymer fine powder such as polytetrafluoroethylene fine powder and aluminum oxide powder with an organic lubricant which has a viscosity of at least 0.45 centipoise at 25° C. and is liquid under the conditions of subsequent extrusion. The fluoropolymer soaks up the lubricant, resulting in a dry, pressure coalescing paste extrusion composition. Utilizing known paste extrusion methods, the paste extrusion composition can be extruded to form sheets, rods, tubes, mono- and multi-filament fibers and coatings.

The paste extruded fluoropolymers of the present invention can be processed to provide expanded or porous fluoropolymer products that contain aluminum oxide. For example, U.S. Pat. No. 3,953566 describes a process for producing porous expanded paste-formed products of tetrafluoro-ethylene polymer having high tensile strength. Unsintered shapes of the polymer can be expanded by stretching in one or more directions within a preferred temperature range of 35° C. to 327° C. Preferred resins utilized in this process have a high degree of crystallinity, preferably in the range of 98% or above, and a correspondingly low amorphous content. Small amounts of monomers, about 0.2% by weight, can be added to the poly(tetrafluoroethylene), and examples include ethylene, chlorotrifluoroethylene or fluorinated propylenes.

Melt Spinning

Melt spinning methods are used with melt processible fluoropolymers such as perfluoroalkoxy, fluorinated ethylene propylene, ethylenetetrafluoroethylene and polyvinylidene fluoride polymers. Exemplary melt spinning processes are described in U.S. Pat. Nos. 3,932,576 and 4,302,556, the entire content of which are incorporated herein. U.S. Pat. No. 4,302,556 discloses forming a blend at 99-40 wt. % of a first polyvinylidene fluoride component having an inherent viscosity higher than 1.30 dl/g and 1-60 wt. % of a second polyvnylidene fluoride component having an inherent viscosity lower than 1.20 dl/g, the blend having a critical shearing stress lower than $2.8. \times 10^4$ dyne/cm2 and subjected to melt-spinning and successively to a primary and a secondary stretching at 70° C.-180° C., the overall stretch factor being selected to 4-10. In the present invention, aluminum oxide powder is mixed with the first and second polyvinylidene fluoride components to provide the blend a concentration of aluminum oxide particles of about 0.1% to 5%. The blend can pelletized and melt spun to form polyvinylidene fluoride filaments containing aluminum oxide.

EXAMPLES

The present invention will be explained further in detail by the following Examples. In each of the Examples, the intermediate, cellulosic ether-based PTFE fiber structures were prepared in accordance with the method described in U.S. Pat. Nos. 5,820,984; 5,762,846, and 5,723,081 and subsequently processed. Utilizing the method described herein, fluoropolymer fibers including, by weight, 99.9% PTFE-0.1% $Al_2O_3$ and 99.0% PTFE-1.0% $Al_2O_3$ were prepared and evaluated as further described in Tables 1 through 6. Although not specifically described herein, it will be appreciated by one of skill in the art that other concentrations of $Al_2O_3$ may be used in the preparation of the PTFE fiber structure. In addition, other components, such as a polymer modifier, may be added to the spin mix in very low concentrations to improve the flow ability of the melted PTFE around the $Al_2O_3$ particles. The use of a polymer modifier could increase tenacity if the tenacity of the resulting fiber is not sufficient. The spin mix was prepared from an aqueous dispersion of fluoropolymer particles containing PTFE dispersion obtained from by E.I. duPont de Nemours & Co. The matrix polymer utilized in the spin mix was CS Polymer (Hydroxypropyl Cellulose) obtained from Shin Etsu Chemical Industry Co. (Tokyo, Japan).

The fiber structures were processed in accordance with the present invention and three, continuous multi-filament yarns with varying denier (approximately 370, 2500 and 2570) were prepared and evaluated.

Experiment 1

400 Denier-1.0% $Al_2O_3$

TABLE 1

| | | | | Properties of Standard Fiber | | | | |
|---|---|---|---|---|---|---|---|---|
| Name | Denier/dpf | Den. Spec | Tenacity (gf/den) | E.B. (%) | L-Color | Avg. Force (gF) | Peak Force (gF) | Shrinkage (%) |
| 400 Reg. | 400/6.7 | 340-460 | 2.00 (1.60-2.40) | 15.0 (8.0-22.0) | 15.5 (12.5-18.5) | 43.1 (23.9-55.0) | 54.6 (42.4-72.8) | 25.1 (22.6-31.7) |

TABLE 2

| | Experimental 400 Denier-1.0% $Al_2O_3$ | | | |
|---|---|---|---|---|
| BOBBIN # | DENIER | TENACITY (g/den) | E.B. (%) | L-Color |
| 1 | 404 | 1.69 | 11.31 | 16.91 |
|   |     | 1.47 | 10.53 | 16.94 |
| 2 | 344 | 1.65 | 11.15 | 17.17 |
|   |     | 1.66 | 10.65 | 17.06 |
| Sampled Average | | | | |
|   | 374 | 1.62 | 10.91 | 17.02 |

Experiment 2

2400 Denier-1.0% $Al_2O_3$

TABLE 3

| | | | Properties of Standard Fiber | | | | | |
|---|---|---|---|---|---|---|---|---|
| Name | Denier/dpf | Den. Spec | Tenacity (gf/den) | E.B. (%) | L-Color | Avg. Force (gF) | Peak Force (gF) | Shrinkage (%) |
| 2400 Reg. | 2400/6.7 | 2100-2700 | 1.50 (1.30-1.76) | 30.0 (19.0-41.0) | 17.6 (15.1-20.1) | 161.3 (88.3-207.8.0) | 186.4 (145.9-262.5) | 21.7 (17.7-27.7) |

TABLE 4

| | Experimental 2400 Denier-1.0% $Al_2O_3$ | | | |
|---|---|---|---|---|
| BOBBIN # | DENIER | TENACITY (g/den) | E.B. (%) | L-Color |
| 1 | 2440 | 1.43 | 22.37 |  |
|   |      | 1.40 | 21.90 | 19.18 |
| 2 | 2700 | 1.41 | 23.27 | 19.31 |
|   |      | 1.35 | 21.61 | 19.28 |
| Sampled Average | | | | |
|   | 2570 | 1.40 | 22.29 | 19.26 |

Experiment 3

2400 Denier-0.1% Al₂O₃

TABLE 5

Properties of Standard Fiber

| Name | Denier/dpf | Den. Spec. | Tenacity (gf/den) | E.B. (%) | L-Color | Avg. Force (gF) | Peak Force (gF) | Shrinkage (%) |
|---|---|---|---|---|---|---|---|---|
| 2400 Reg. | 2400/6.7 | 2100-2700 | 1.50 (1.30-1.76) | 30.0 (19.0-41.0) | 17.6 (15.1-20.1) | 161.3 (88.3-207.8.0) | 186.4 (145.9-262.5) | 21.7 (17.7-27.7) |

TABLE 6

Experimental 400 Denier-0.1% Al₂O₃

| BOBBIN # | Denier | Tenacity (g/den) | E.B. (%) | L-Color |
|---|---|---|---|---|
| 0 | — | | | |
| 1 | 2210 | | | |
| 2 | 2202 | | | |
| 3 | 2510 | | | |
| 4 | 2444 | 1.62 | 20.25 | 16.84 |
|   |      | 1.57 | 19.09 | 17.51 |
| 5 | 2430 | 1.54 | 19.42 | 16.90 |
|   |      | 1.41 | 18.76 | 16.94 |
| 6 | 2484 | | | |
| 7 | 2424 | | | |
| 8 | 2390 | | | |
| 9 | 2520 | 1.66 | 20.55 | 18.16 |
|   |      | 1.64 | 20.13 | 17.39 |
| 10 | 2630 | 1.51 | 19.49 | 17.90 |
|    |      | 1.40 | 16.93 | 17.45 |
| 11 | 2442 | 1.49 | 18.39 | 17.57 |
|    |      | 1.37 | 18.09 | 17.47 |
| 12 | 2392 | | | |
| 13 | 2596 | | | |
| 14 | 2560 | | | |
| 15 | 2530 | 1.53 | 18.72 | 17.41 |
|    |      | 1.42 | 18.00 | 17.33 |
| 16 | 2560 | | | |
| Sampled Average | 2499 | 1.51 | 18.99 | 17.41 |

[1] Three bobbins made that were too small
[2] Air in line

Examination of the prepare yarns in Experiments 1, 2 and 3 included testing of the tensile strength, elongation before break (E.B. %) and L-color. These values represent fundamental properties that are used to establish limitations on fiber-processing and upon their end-use applications. Tensile strength is the measure of strength of a fiber or yarn. This is usually defined as the ultimate (breaking) force of the fiber (in gram-force units) divided by the denier. To measure the tensile strength of a polymer sample, the sample is stretched by a machine such as an Instron. This machine clamps each end of the sample and elongates the sample. During stretching, the device measures the amount of force (F) that is exerted on the fiber. The amount of force exerted on the fiber is increased until it breaks. The stress needed to break the sample is the tensile strength of the material. The numerical expression of the force is then divided by the cross-sectional area (in this case Denier) and resulting tenacity is expressed as grams per Denier (g/denier). The elongation-to-break is a measure of the change in fiber length before breaking. When stress is applied to a fiber, the sample deforms by stretching, becoming longer. Percent elongation refers to the length the of the sample after stretching as compared to the original length of the sample This usually is expressed as a percent.

L-Color is calculated on a range from 0 to 100 where O is black and 100 is white. Thus, lower the L-Color the darker the color.

The tensile strength, E.B. % and L-color were determined for the yarns incorporating Al₂O₃ and these values compared to values obtained for standard yarns with the same denier (i.e., yarns containing no Al₂O₃). Tables 1, 3 and 5 illustrate the properties of standard 100% PTFE fibers. Tables 2, 4 and 6 illustrate the properties of the PTFE/Al₂O₃ fibers of the present invention.

The minimum tested average tenacity is at least 1.40 gf/den, while the average elongation to break was at least 10.91%. The mix was found to be stable at a maximum usable temperature of about 260° C., with intermittent excursions of about 288° C. not exceeding 30 minutes.

Experiment 4

Friction Coefficient Determination and Wear Rate Analysis of PTFE Loaded Vinyl Ester Films Three differently loaded PTFE vinyl ester films (0%, 0.1% and 1.0% Al₂O₃ concentration) were prepared in accordance with the present invention and the wear rate and friction coefficient measured for each sample. Although not specifically described herein, it will be appreciated by one of skill in the art that other concentrations of Al₂O₃ may be used in the preparation of the PTFE film. In addition, other components may be added to the vinyl ester mix in very low concentrations to aid in the preparation of the films.

The films were evaluated through application of pin-on-disk (POD) testing at three load levels (2N, 5N and 10N) as further described in Tables 7 through 10. The POD tester is one of the best known and most widely used tribotesters. The apparatus consists of a stationary pin that, under the influence of a dead-weight, rests on a rotating disk (i.e., sample). The user has the ability to control and measure the applied normal load onto the sample, unidirectional speed or oscillation frequency of the spinning disk, as well as environmental parameters such as temperature, pressure, type of gas (vacuum, air, nitrogen, refrigerant, etc.) and presence of a lubricant. Transducers measure both the normal and friction forces applied to the sample. The pin holder is attached to a fixture that is allowed to deflect slightly; the transducer measures this deflection and converts it to a force. Performance is generally characterized by friction coefficient and wear rates (wear per unit time) determined my mass or volume loss. The wear tracks produced by the POD were then analyzed through scanning electron microscopy (SEM) and the wear rate for each sample calculated.

The testing parameters were as follows:
1. The friction coefficient of each of the vinyl ester film samples was determined through POD testing.
2. The width of each wear track imparted on the vinyl ester film samples through POD testing was measured using SEM.
3. Light microscopy was used to measure the diameter of the wear scar following POD testing.
4. The area of the wear scar was calculated.
5. TriboX software (CSM Instruments Peseux, Switzerland) was used to calculate wear rate of the vinyl ester films.

The characteristics of each sample are indicated in Table 7 below. Table 8 illustrates the raw data collected for friction coefficient measurements. Table 9 illustrates the raw data collected for wear rate measurements. Table 10 illustrates the average friction coefficient and wear rate for each sample.

TABLE 7

Alumina concentration

|  | Flock | % Alumina in Flock |
|---|---|---|
| Sample 1 | 1/64" | 0% |
| Sample 2 | 1/64" | 1% |
| Sample 3 | 1/64" | 0.10% |

TABLE 8

Raw data measured for wear rate.

| Load [N] | Sliding Velocity [cm/sec] | Wear rate [mm3/N/m] | | | | | |
|---|---|---|---|---|---|---|---|
| | | Sample 1 | | Sample 2 | | Sample 3 | |
| | | Side A | Side B | Side A | Side B | Side A | Side B |
| 2 | 5 | 3.81E−05 | 2.26E−05 | 1.61E−05 | 1.29E−05 | 2.98E−05 | 1.27E−05 |
| | 7 | 3.50E−05 | 4.41E−05 | 3.27E−05 | 1.73E−05 | 3.09E−05 | 1.12E−05 |
| | 10 | 4.46E−05 | 2.65E−05 | 2.37E−05 | 1.90E−05 | 2.50E−05 | 1.37E−05 |
| 5 | 5 | 4.22E−05 | 3.64E−05 | 4.32E−05 | 5.42E−05 | 8.51E−05 | 1.65E−05 |
| | 7 | 5.71E−05 | 4.39E−05 | 5.37E−05 | 5.46E−05 | 6.54E−05 | 2.33E−05 |
| | 10 | 5.04E−05 | 3.94E−05 | 4.95E−05 | 4.86E−05 | 5.32E−05 | 2.12E−05 |
| 10 | 5 | 4.90E−05 | 3.09E−05 | 2.93E−05 | 3.14E−05 | 4.83E−05 | 1.90E−05 |
| | 7 | 5.52E−05 | 2.66E−05 | 3.11E−05 | 3.27E−05 | 6.60E−05 | 2.96E−05 |
| | 10 | 4.59E−05 | 3.97E−05 | 3.01E−05 | 2.96E−05 | 5.49E−05 | 2.66E−05 |
| Average | | 4.64E−05 | 3.45E−05 | 3.44E−05 | 3.34E−05 | 5.10E−05 | 1.93E−05 |

TABLE 9

Raw data measured for friction coefficient.

| Load [N] | Sliding velocity [cm/sec] | Friction Coefficient | | | | | |
|---|---|---|---|---|---|---|---|
| | | Sample 1 | | Sample 2 | | Sample 3 | |
| | | Side A | Side B | Side A | Side B | Side A | Side B |
| 2 | 5 | 0.085 | 0.081 | 0.086 | 0.077 | 0.390 | 0.062 |
| | 7 | 0.088 | 0.080 | 0.134 | 0.073 | 0.407 | 0.085 |
| | 10 | 0.117 | 0.072 | 0.105 | 0.081 | 0.379 | 0.074 |
| 5 | 5 | 0.120 | 0.079 | 0.083 | 0.064 | 0.207 | 0.072 |
| | 7 | 0.098 | 0.058 | 0.086 | 0.067 | 0.295 | 0.057 |
| | 10 | 0.081 | 0.070 | 0.092 | 0.074 | 0.294 | 0.075 |
| 10 | 5 | 0.087 | 0.082 | 0.092 | 0.065 | 0.174 | 0.071 |
| | 7 | 0.077 | 0.077 | 0.108 | 0.047 | 0.126 | 0.073 |
| | 10 | 0.088 | 0.079 | 0.095 | 0.074 | 0.118 | 0.067 |
| Average | | 0.093 | 0.075 | 0.098 | 0.069 | 0.266 | 0.071 |

TABLE 10

Average friction coefficients and wear rates

| Alumina | 0% | | 1.0% | | 0.1% | |
|---|---|---|---|---|---|---|
| Texture | Rough | Smooth | Rough | Smooth | Rough | Smooth |
| Friction Coef. | 0.093 | 0.075 | 0.098 | 0.069 | 0.266 | 0.071 |
| Wear Rate | 4.64E−05 | 3.45E−05 | 3.44E−05 | 3.34E−05 | 5.1E−05 | 1.93E−05 |

Side A = Rough
Side B = Smooth

Figure 1B:
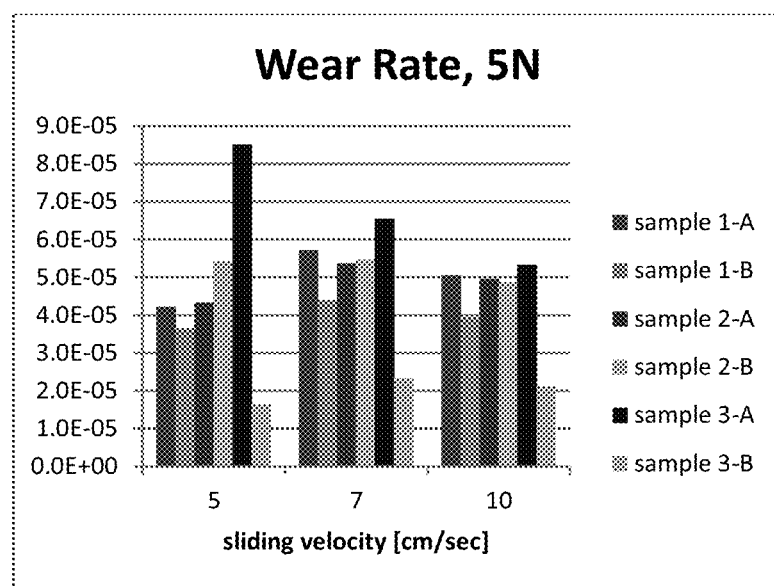
FIG. 1B is a graphical illustration of the calculated wear rates of three vinyl ester film samples with varying concentrations of $Al_2O_3$ and a pin load of 5N.
Figure 1C:
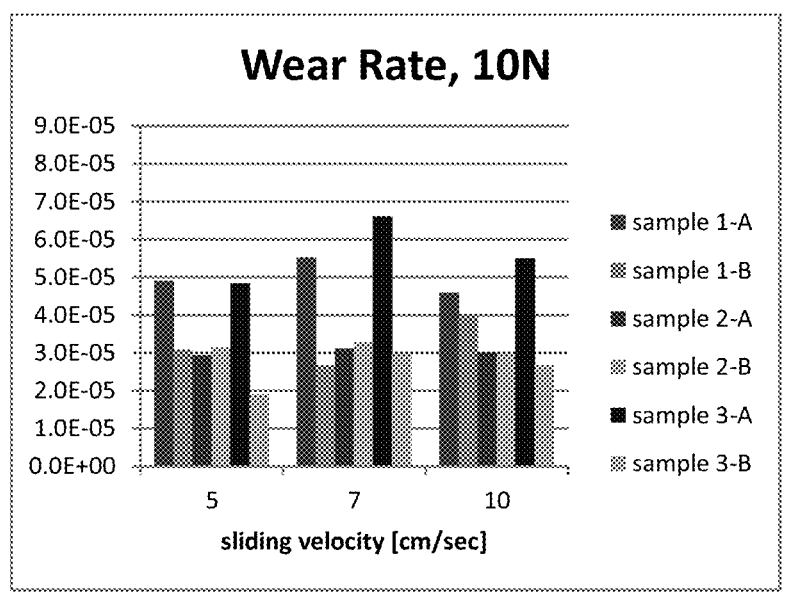
FIG. 1C is a graphical illustration of the calculated wear rates of three vinyl ester film samples with varying concentrations of $Al_2O_3$ and a pin load of 10N.
Figure 2A:
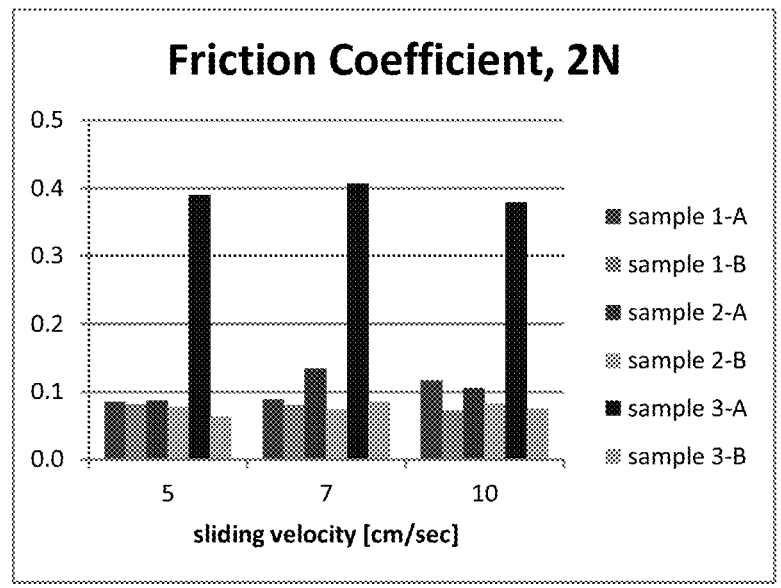
FIG. 2A is a graphical illustration of the calculated friction coefficient of the three vinyl ester film samples with varying concentrations of $Al_2O_3$ and a pin load of 2N.
Figure 2B:
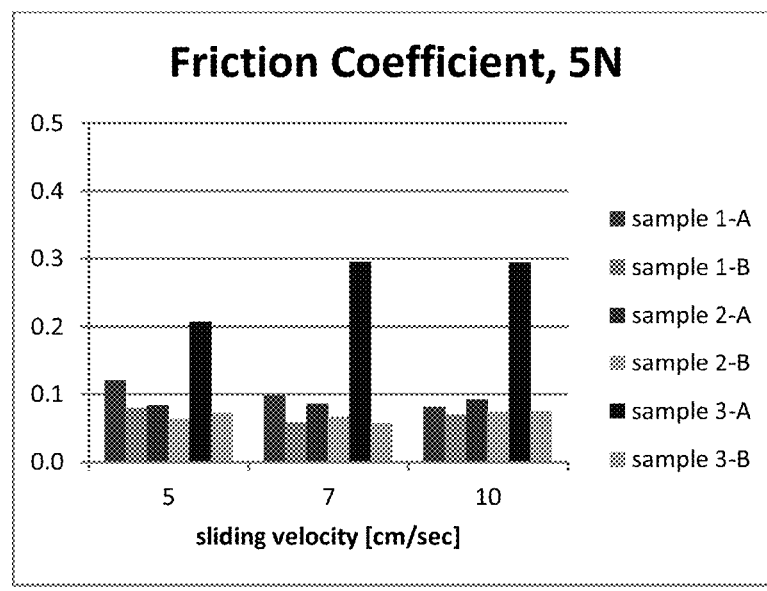
FIG. 2B is a graphical illustration of the calculated friction coefficient of the three vinyl ester film samples with varying concentrations of $Al_2O_3$ and a pin load of 5N.
Figure 2C:
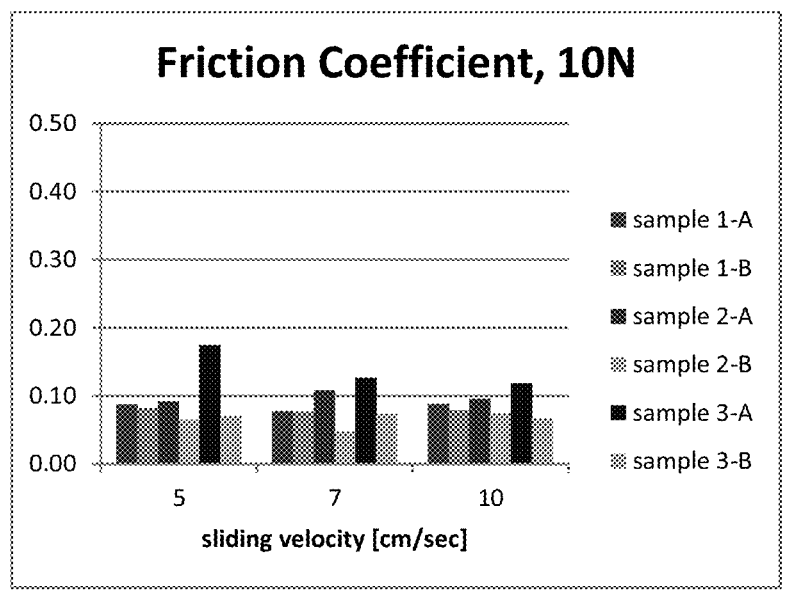
FIG. 2C is a graphical illustration of the calculated friction coefficient of the three vinyl ester film samples with varying concentrations of $Al_2O_3$ and a pin load of 10N.

FIGS. 1A, 1B and 1C are graphical illustrations of the data included in Table 8 and summarized in Table 10. This data illustrates the calculated wear rates of three vinyl ester film samples as described by the present disclosure with varying concentrations of $Al_2O_3$ (0%, 0.1% and 1.0%). The film samples contain a rough side (side A) and a smooth side (side B), each of which was tested for wear rate. Each sample was tested with a pin load of 2N (FIG. 1A), 5N (FIG. 1B) and 10N (FIG. 1C). FIGS. 2A, 2B and 2C are graphical illustrations of the data included in Table 9 and summarized in Table 10. This data illustrates the calculated friction coefficient of the three vinyl ester film samples described above in FIGS. 1A-1C. Similar to FIGS. 1A-1C, both sides of each sample were tested with a pin load of 2N (FIG. 2A), 5N (FIG. 2B) and 10N (FIG. 2C).

In the majority of tested samples, the "B-side" (smooth side) yielded the slowest wear rates (measured as a function of variable sliding velocity and loading conditions) as well as the lowest friction coefficients. As illustrated by FIGS. 1A-1C, the vinyl ester films with a 0.1% concentration of $Al_2O_3$ had the lowest wear rates. The samples with an $Al_2O_3$ concentration of 0.1% and 1.0% have frictional coefficients lower than samples containing no $Al_2O_3$ (FIGS. 2A-2C). These experiments demonstrate that vinyl ester film plates with a $Al_2O_3$ concentration of 0.1% have the optimal combination of low wear rate and low friction coefficient.

Inclusion of the $Al_2O_3$ in the fiber matrix in molded PTFE parts, such as bearings, improves wear resistance. As described in the present disclosure, $Al_2O_3$ also improves wear when utilized in a matrix spun PTFE fiber. This fiber also shows increased cut resistance in materials constructed from filament yarns of this fabric as well as improving thermal conductive properties. These properties will allow improved wear characteristics of composite bearings made from PTFE fibers as well as other applications where cut resistance (i.e., gloves) and thermal conductivity improvements (i.e., laminated cooking belts) are needed.

As will be apparent to one skilled in the art, various modifications can be made within the scope of the aforesaid description. Such modifications being within the ability of one skilled in the art form a part of the present invention and are embraced by the claims below.

It is claimed:

1. A fluoropolymer fiber comprising a blend of aluminum oxide particles and a fluoropolymer wherein the blend includes from 0.1% by weight to about 1.0% by weight of the aluminum oxide particles.

2. The fluoropolymer fiber of claim 1 including 0.1% by weight of the aluminum oxide particles.

3. The fluoropolymer fiber of claim 1 including 1.0% by weight of the aluminum oxide particles.

4. The fluoropolymer fiber of claim 1 wherein the fluoropolymer fiber is a monofilament fiber.

5. The fluoropolymer fiber of claim 1 wherein the fluoropolymer fiber is a multifilament yarn.

6. The fluoropolymer fiber of claim 1 wherein the fluoropolymer fiber is an expanded fluoropolymer fiber.

7. The fluoropolymer fiber of claim 1 wherein the fluoropolymer fiber is a matrix spun fiber.

8. The fluoropolymer fiber of claim 1 wherein the fluoropolymer fiber is a paste extruded fiber.

9. The fluoropolymer fiber of claim 1 wherein the fluoropolymer fiber is a melt spun fiber.

10. The fluoropolymer fiber of claim 1 wherein the fluoropolymer is selected from the group consisting of polytetrafluoroethylene, perfluoroalkoxy (PFA) polymer, fluorinated ethylene propylene, ethylenetetrafluoroethylene, polyvinylidene fluoride and combinations therefore.

11. The flouropolymer fiber of claim 1 wherein the fiber is formed into a product selected from the group consisting of a bearing, a bushing, a fabric, a belt, a diaphragm, a coating, a filter, a seal, a glove, and a laminated cooking belt.

12. A flock material comprising the fluoropolymer fiber of claim 1.

13. A member comprising the fluoropolymer fiber of claim 1 wherein the member includes a substance selected from the group consisting of a plastic, a paper, a rubber, a metal and any combination thereof.

14. The member of claim 13 wherein the member is selected from the group consisting of a bearing, a bushing, a fabric, a belt, a diaphragm, a coating, a film and a filter.

* * * * *